(12) United States Patent
Luedtke

(10) Patent No.: US 9,929,688 B2
(45) Date of Patent: Mar. 27, 2018

(54) ELECTRIC MACHINE TORQUE CAPABILITY DETERMINATION

(75) Inventor: Daniel Luedtke, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 420 days.

(21) Appl. No.: 13/607,008

(22) Filed: Sep. 7, 2012

(65) Prior Publication Data

US 2014/0070741 A1    Mar. 13, 2014

(51) Int. Cl.
| | |
|---|---|
| *H02P 1/46* | (2006.01) |
| *H02P 23/14* | (2006.01) |
| *B60L 15/20* | (2006.01) |
| *B60W 10/26* | (2006.01) |
| *B60W 10/08* | (2006.01) |
| *B60W 20/00* | (2016.01) |
| *B60K 6/445* | (2007.10) |

(52) U.S. Cl.
CPC .............. *H02P 23/14* (2013.01); *B60L 15/20* (2013.01); *B60W 10/08* (2013.01); *B60W 10/26* (2013.01); *B60W 20/00* (2013.01); *B60K 6/445* (2013.01); *B60W 2510/081* (2013.01); *B60W 2540/10* (2013.01); *B60W 2710/082* (2013.01); *B60W 2710/083* (2013.01); *B60W 2710/248* (2013.01); *Y02T 10/6239* (2013.01); *Y02T 10/645* (2013.01); *Y02T 10/72* (2013.01); *Y02T 10/7275* (2013.01)

(58) Field of Classification Search
USPC ....... 318/700, 724, 254, 138, 439, 811, 802, 318/805, 432–434, 798, 799, 723, 716, 318/812
See application file for complete search history.

(56) References Cited

U.S. PATENT DOCUMENTS

| | | | |
|---|---|---|---|
| 5,552,977 A | 9/1996 | Xu et al. | |
| 5,724,477 A * | 3/1998 | Webster et al. | ............... 388/815 |
| 6,573,745 B2 | 6/2003 | Raftari et al. | |
| 6,586,904 B2 * | 7/2003 | McClelland et al. | ......... 318/701 |
| 7,023,168 B1 * | 4/2006 | Patel et al. | ..................... 318/757 |
| 7,576,501 B2 | 8/2009 | Okubo et al. | |
| 7,586,286 B2 * | 9/2009 | Cheng | ................... B60L 15/025 318/700 |
| 7,592,765 B2 | 9/2009 | Rahman et al. | |
| 7,595,600 B2 | 9/2009 | Patel et al. | |

(Continued)

*Primary Examiner* — Bickey Dhakal
(74) *Attorney, Agent, or Firm* — David B. Kelley; Brooks Kushman P.C.

(57) ABSTRACT

A vehicle comprises an electric machine configured with at least one controller issuing torque commands with the use of a voltage bus. The controller may be configured to respond to a torque requests based on multiple vehicle system inputs including vehicle speed, position of the accelerator pedal and brake pedal, and various other vehicle data. The controller may respond to a torque request that exceeds a threshold value by issuing torque commands for the electric machine based on a speed of the electric machine and a voltage on the bus. Based on the speed of the electric machine and voltage on the bus, the controller may issue a constant torque output by the electric machine as the speed and voltage vary. Calculating a ratio using speed of the electric machine to voltage on the bus to determine torque capability may result as a constant torque when the ratio is constant.

12 Claims, 7 Drawing Sheets

(56) References Cited

U.S. PATENT DOCUMENTS

| | | |
|---|---|---|
| 7,642,737 B2 | 1/2010 | Bae et al. |
| 8,018,185 B2 | 9/2011 | Yamamoto et al. |
| 8,080,956 B2 | 12/2011 | Wu |
| 8,193,749 B2 | 6/2012 | Yamamoto et al. |
| 2004/0036434 A1* | 2/2004 | Chen et al. .................. 318/432 |
| 2007/0164693 A1* | 7/2007 | King et al. .................. 318/109 |
| 2008/0309093 A1* | 12/2008 | Ando et al. ................ 290/40 C |
| 2009/0295316 A1 | 12/2009 | Patel et al. |
| 2010/0145559 A1 | 6/2010 | Gauthier et al. |
| 2011/0241578 A1* | 10/2011 | Kim et al. .............. 318/400.02 |
| 2011/0248719 A1* | 10/2011 | Aoki ............................ 324/426 |

* cited by examiner

ELECTRIC MACHINE TORQUE CAPABILITY DETERMINATION

TECHNICAL FIELD

This disclosure relates to control of electric motors.

BACKGROUND

Permanent magnet synchronous motors (PMSMs) are utilized in various applications because they have generally favorable efficiency characteristics relative to other types of motors. Typically, PMSMs have three separate electrical windings within the stator which are each powered by an oscillating alternating current (AC) voltage source. The shaft torque of the motor and the power conversion efficiency depend upon both the magnitude and the phase angle of the oscillating voltage.

In certain applications, such as electric vehicles and hybrid electric vehicles, electrical power is available from a non-oscillating direct current (DC) voltage source such as a battery. Therefore, inverters are utilized to convert the non-oscillating voltage into three oscillating voltages. Inverters contain a discrete number of switching devices and are therefore capable of supplying only a discrete number of voltage levels at each of the three motor terminals. For a 2-level inverter, at any moment in time, the switching devices are set to electrically connect each of the three AC terminals to either the positive or the negative DC terminal. Thus, eight switching states are available. Two of these switching states, in which all three terminals are connected to the same DC terminal, are called zero states. In the remaining six states, one AC terminal is connected to one of the DC bus terminals and the other two AC terminals are connected to the opposite DC bus terminal. The inverter is capable of switching rapidly among these eight states.

Two basic control methods are known for switching among inverter states to regulate torque output of a PSMS. In the six-step method, the inverter cycles through the six non-zero states once per cycle of the rotor, producing an oscillating voltage and current in each winding. A rotor cycle is defined relative to motor poles and does not necessarily correspond to a complete revolution. The amplitude of the AC voltage is dictated by the DC voltage. The torque is dictated by the DC voltage, the rotor speed, and the phase difference between these quasi-sinusoidal AC voltage signals and the rotor position. A controller issues commands to the inverter indicating when to switch to the next state in the sequence. In the PWM method, the inverter switches very rapidly among two of the non-zero states and one of the zero states. A controller specifies what fraction of the time should be spent in each of these three states by specifying PWM duty cycles. The controller updates these duty cycles at regular intervals such that the frequency of updates is significantly higher than the frequency of the rotor rotation.

Some general characteristics of typical PMSMs are illustrated in an exemplary embodiment shown in FIG. 1. The operating region depends upon the DC voltage. The positive speed, positive torque operating region at a reference DC voltage may be bounded as illustrated by solid lines 110, 112, and 114. At low speeds, the maximum available torque may be limited by a maximum winding current as indicated by line 110. Line 112 indicates a maximum available torque at higher speeds which is limited by the voltage. At point 116, called the corner point, both current and voltage are at their respective maximums. Line 114 indicates an overall maximum rated speed. The dotted lines indicate the corresponding operating region at a higher DC voltage above the reference DC voltage. The PMSM cannot realize bursts of torque exceeding the maximum winding current without saturating the magnetic core and rendering any increase in current or voltage as useless. The PMSM can be irreparably damaged by excessive sparking at the commutator if a burst of torque exceeds the maximum operating torque rating of the electric machine.

PMSMs may generate either positive or negative torque and may rotate in either positive or negative directions. In the positive speed, negative torque quadrant, a PMSM acts as a generator converting mechanical energy into electrical energy. In this quadrant, the characteristics are similar to that shown in FIG. 1, although the minimum torque curve corresponding to the voltage limit may not be a mirror image of line 112. The negative speed region closely tracks the positive speed region rotated 180 degrees about the origin.

SUMMARY OF THE DISCLOSURE

A vehicle comprises an electric machine configured with at least one controller issuing torque commands with the use of a voltage bus. The controller may be configured to respond to torque requests based on multiple vehicle system inputs including vehicle speed, position of the accelerator pedal and brake pedal, and various other vehicle data. The controller may respond to a torque request that exceeds a threshold value by issuing torque commands for the electric machine based on a speed of the electric machine and a voltage on the bus. Based on the speed of the electric machine and voltage on the bus, the controller may issue a constant torque output by the electric machine as the speed and voltage vary. The torque output may remain constant based on the ratio now used for determining torque. Calculating a ratio using speed of the electric machine to voltage on the bus to determine torque capability may result as a constant torque when the ratio is constant.

A vehicle comprises an electric machine configured with at least one controller issuing torque commands with the use of a voltage bus while maintaining an unaltered magnitude and phase of current through the windings of the electric machine. The vehicle may comprise at least one controller configured to respond to torque requests based on multiple vehicle system inputs including vehicle speed, position of the accelerator pedal and brake pedal, and various other vehicle data. The controller is configured to respond to a torque request that exceeds a threshold value by issuing torque commands for the electric machine based on a speed of the electric machine and a voltage on the bus. Based on the speed of the electric machine and voltage on the bus, the controller may issue substantially unaltered magnitude and phase of a current through the windings as the speed and voltage vary with a constant ratio of the speed to voltage.

A method for controlling an electric machine responds to torque requests that exceed a threshold value. The controller may issue torque commands for the electric machine based on a speed of the electric machine and a voltage on a bus such that a magnitude and phase of a current through the windings of the electric machine remains substantially unaltered as the speed and voltage vary with a constant ratio of the speed to voltage. This method may improve the utilization of electric machine capability while providing a delivered torque closer to the requested torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
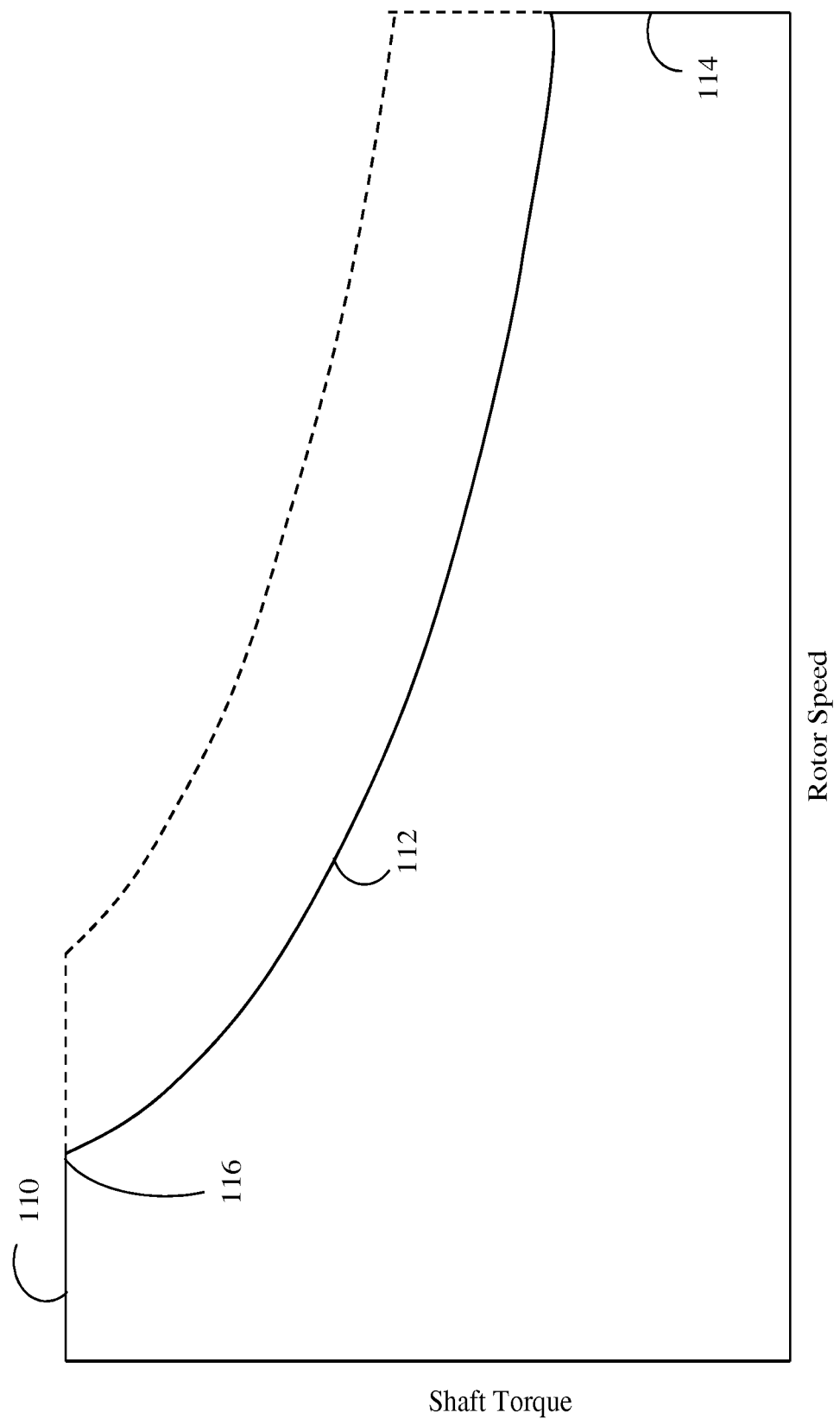
FIG. 1 is a graph of general characteristics of permanent magnet synchronous motors operating regions.
Figure 2:
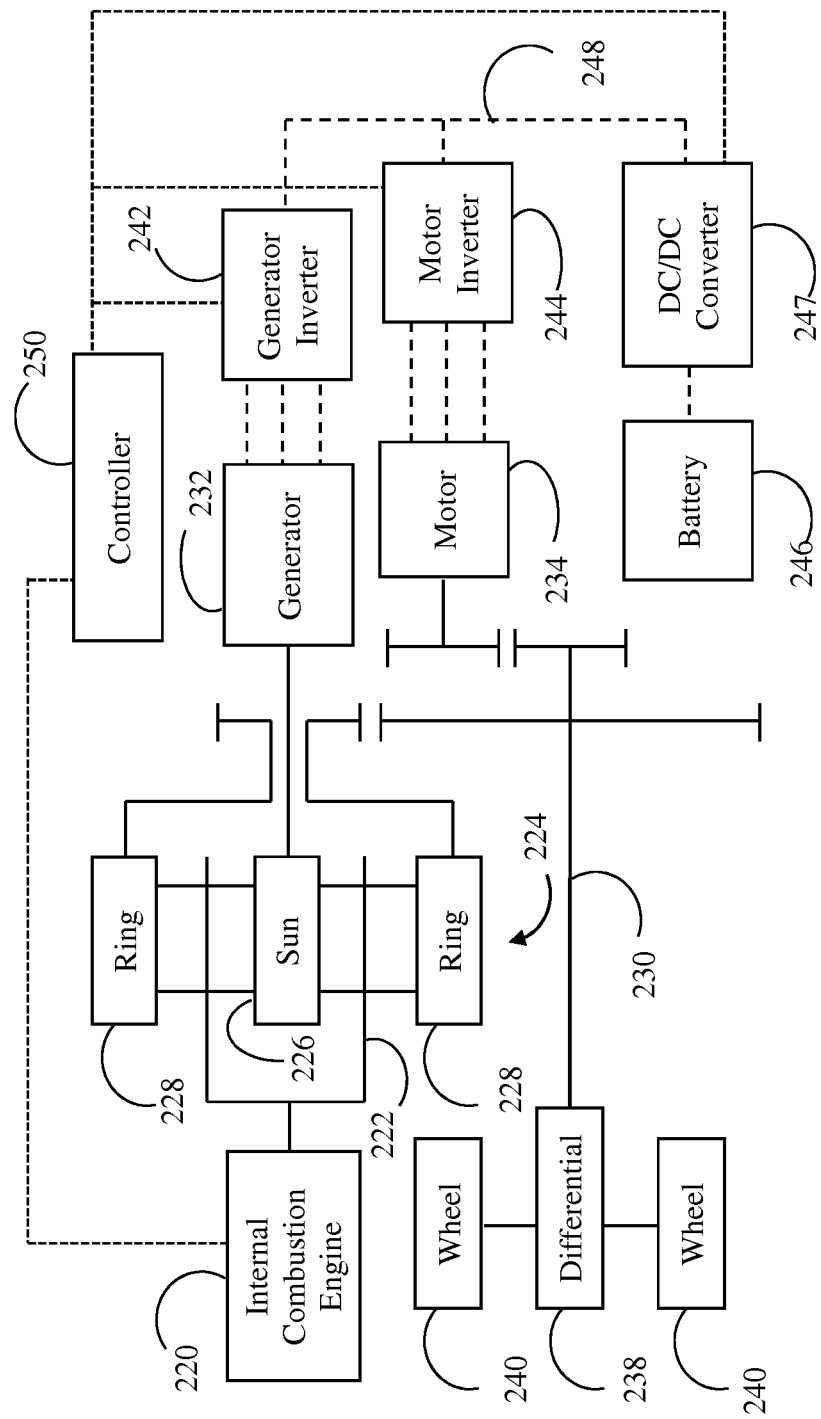
FIG. 2 is a schematic diagram of an exemplary hybrid electric powertrain.

A schematic diagram of an exemplary hybrid electric powertrain is illustrated in FIG. 2. However, the claimed invention is not limited to this powertrain topology. Internal combustion engine 220 drives carrier 222 of planetary gear set 224. The engine torque is divided by gear set 224 between sun gear 226 and ring gear 228. The ring gear torque is transmitted mechanically to output shaft 230. The sun gear torque is absorbed by generator 232. Motor 234 is driveably connected to output shaft 230. Throughout this description, the terms generator and motor are used merely as labels to identify these components. Both generator 232 and motor 234 are reversible electrical machines capable of both converting mechanical shaft power into electrical power and converting electrical power into mechanical shaft power. The driveshaft is driveably connected to a differential which divides the power between left and right wheels 240 while allowing slight differences in wheel speeds. Electrical power connections are illustrated by dashed lines with long dashes. Generator 232 and motor 234 are electrically powered by inverters 242 and 244 respectively via three phase power circuits. Inverters 242 and 244 draw power from or supply power to DC electrical bus 248. Electrical power is stored in battery 246. DC to DC Converter 247 converts the voltage level of battery 246 to the voltage level of DC bus 248. The DC bus voltage may be either higher or lower than the battery voltage. Control signal connections are illustrated by dashed lines with short dashes. Controller 250 issues control signals to DC to DC converter 247 specifying the desired voltage for the DC electrical bus 248. Controller 250 also issues control commands to engine 220 and inverters 242 and 244 to regulate the torque generated by the engine, generator 232, and motor 234 respectively. If the torque actually delivered by motor 234 differs significantly from the requested torque, then vehicle acceleration will not match the driver's expectation. If the torque actually delivered by generator 232 differs significantly from the requested torque, then engine speed will depart from expected behavior.

Figure 3:
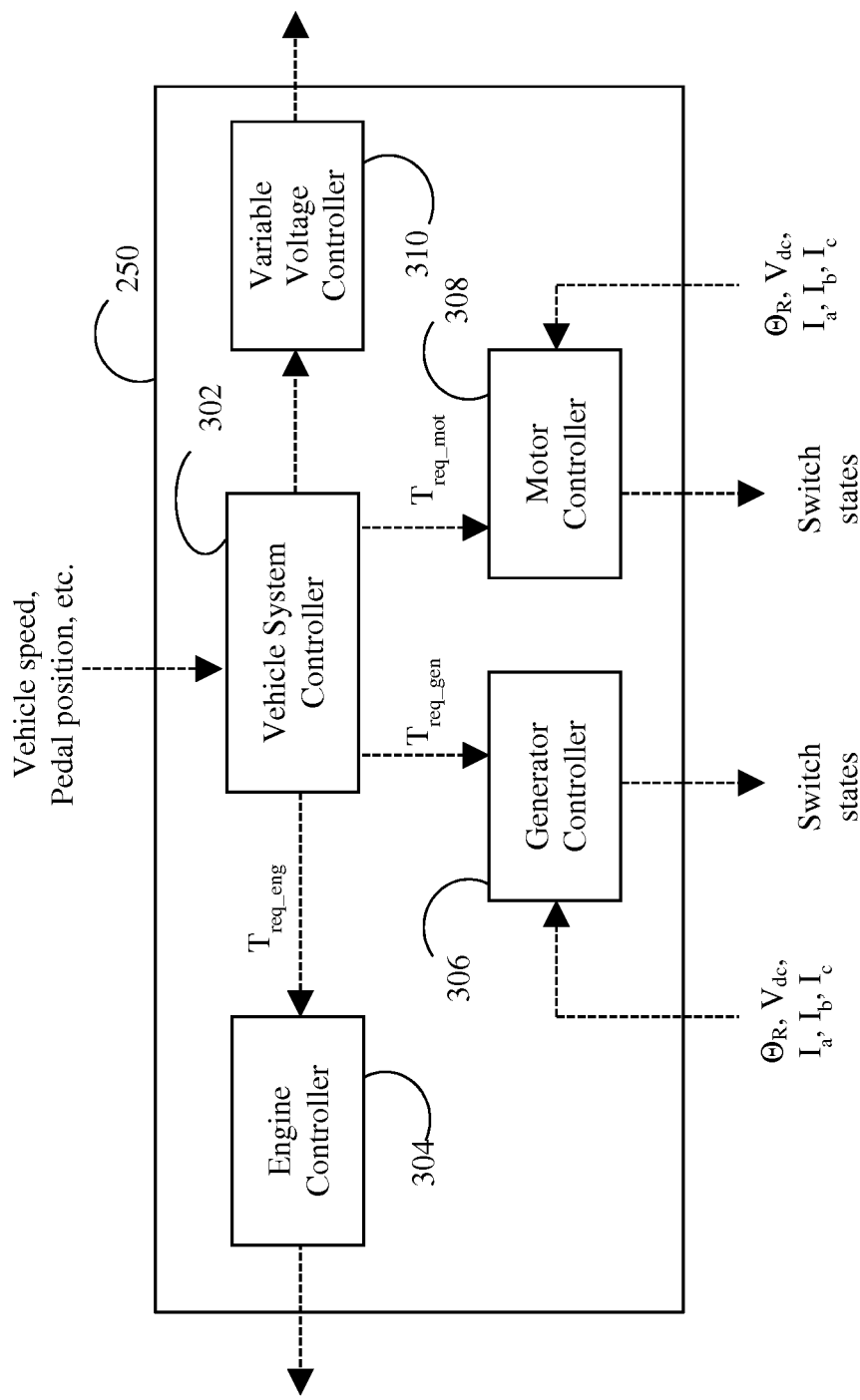
FIG. 3 is a controller schematic in an exemplary hybrid electric powertrain.

Controller 250 is illustrated schematically in more detail in FIG. 3. Vehicle system controller 302 receives signals indicating vehicle speed, the position of the accelerator pedal and brake pedal, and various other vehicle data. Based on this data, the vehicle system controller determines a target DC bus voltage and a target output shaft torque and issues torque requests $T_{req\_eng}$ to engine controller 304, $T_{req\_gen}$ to generator controller 306, and $T_{req\_mot}$ to motor controller 308. The output of generator controller 306 and motor controller 308 are switch states for switches within inverters 242 and 244 respectively. These controllers may use a resolver to monitor angular information for an electric motor. The controllers receive input signals indicating the angular position of the corresponding rotor, labeled $\Theta_R$, the voltage of DC bus 248, labeled $V_{dc}$, and the current in each winding, labeled $I_a$, $I_b$, and $I_c$. Variable Voltage Controller 310 issues commands to DC to DC converter 247 to effectuate the target bus voltage. Controllers 302, 304, 306, 308, and 310 may be implemented as a single micro-controller or as multiple communicating controllers.

One or both of generator 232 and motor 234 may be permanent magnet synchronous motors (PMSMs). For a PMSM, winding voltages $V_a$, $V_b$, and $V_c$ each oscillate at a frequency proportional to the rotor speed and are separated by 120 degrees in phase from one another. Similarly, the resulting winding currents $I_a$, $I_b$, and $I_c$ each oscillate at a frequency proportional to the rotor speed and are separated by 120 degrees in phase from one another. These winding currents induce a rotating magnetic field in the motor which may be out of phase with the rotor. The resulting shaft torque depends upon both the magnitude of the magnetic field and the phase angle relative to the rotor. For convenience, the winding voltages and currents may be represented by vectors in a rotating reference frame that rotates with the rotor. The mapping between rotor position and the rotating reference frame depends upon the number of poles in the motor. The two components of the voltage vector are labeled $V_d$ and $V_q$ while the two components of the current vector are labeled $I_d$ and $I_q$. $V_d$, $V_q$, $I_d$, and $I_q$ do not oscillate based on rotor position. For convenience, the control method will be discussed with respect to motor 234 although it also applies to generator 232.

Figure 4:
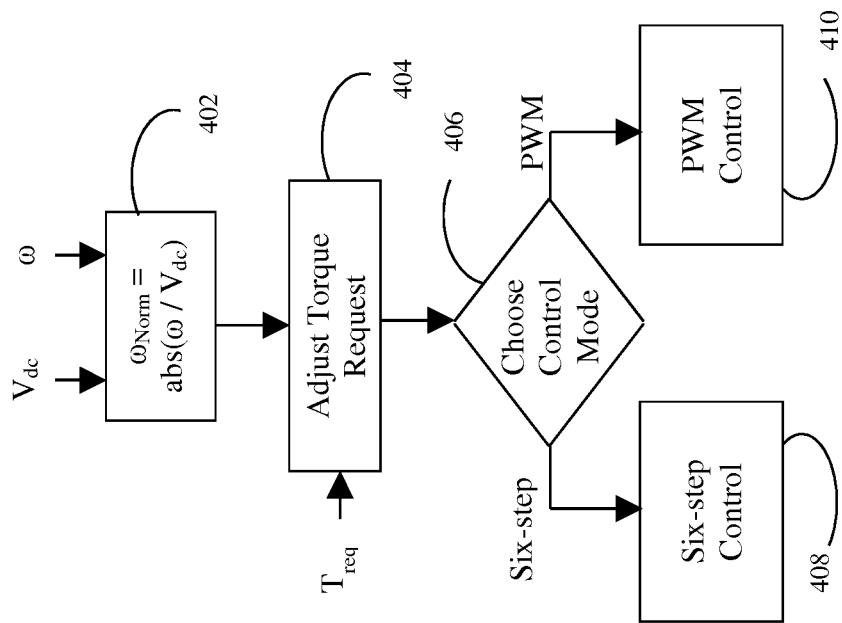
FIG. 4 is a flow chart for the control method for permanent magnet synchronous motors.

FIG. 4 illustrates the computations for each update using PWM and six-step control methods. At 402, the controller computes a normalized speed, $\omega_{Norm}$, by dividing the rotor speed by the bus voltage. At 404, the controller adjusts the torque request from the vehicle system controller if necessary to ensure that the requested torque is within the motor operating region for the current rotor speed and bus voltage. At 406, the controller selects between PWM and six-step control methods based on the adjusted torque request and the normalized speed. If the six-step mode is selected, the controller computes inverter commands at 408 based on the six-step method. If the PWM mode is selected, the controller computes inverter commands at 410 based on the PWM method.

Controllers commonly use lookup tables to represent irregular functions. Since the maximum torque capability threshold is a function of both the rotor speed $\omega$ and the bus voltage $V_{dc}$, a multi-dimensional look-up table, such as Table 1, would typically be used. If either of the independent variables, in this case rotor speed $\omega_R$ and the bus voltage $V_{dc}$, fall between the tabulated values, the controller may either select one of the values or interpolate between them. For a non-linear function such as maximum torque capability, either of these approximation methods introduces some error relative to the underlying function. With regard to maximum torque capability, the conservative approach is to select the highest tabulated $V_n$ that is less than $V_{dc}$. Typically, lookup tables are populated during vehicle calibration based on experimental data. Populating the table requires experimentation at a variety of voltage levels. Using a large number of different voltage levels reduces the approximation error but increases the effort required to populate the tables, the memory in the controller consumed by the tables, and the time required to look up a value.

TABLE 1

| | Voltage | | | |
|---|---|---|---|---|
| Speed | $V_1$ | $V_2$ | $V_3$ | $V_n$ |
| $\omega_1$ | $T_{11}$ | $T_{12}$ | $T_{13}$ | $T_{1n}$ |
| $\omega_2$ | $T_{21}$ | $T_{22}$ | $T_{23}$ | $T_{2n}$ |
| $\omega_3$ | $T_{31}$ | $T_{32}$ | $T_{33}$ | $T_{3n}$ |
| $\omega_4$ | $T_{41}$ | $T_{42}$ | $T_{43}$ | $T_{4n}$ |
| $\omega_5$ | $T_{51}$ | $T_{52}$ | $T_{53}$ | $T_{5n}$ |
| $\omega_6$ | $T_{61}$ | $T_{62}$ | $T_{63}$ | $T_{6n}$ |
| $\omega_m$ | $T_{m1}$ | $T_{m2}$ | $T_{m3}$ | $T_{mn}$ |

Figure 5:
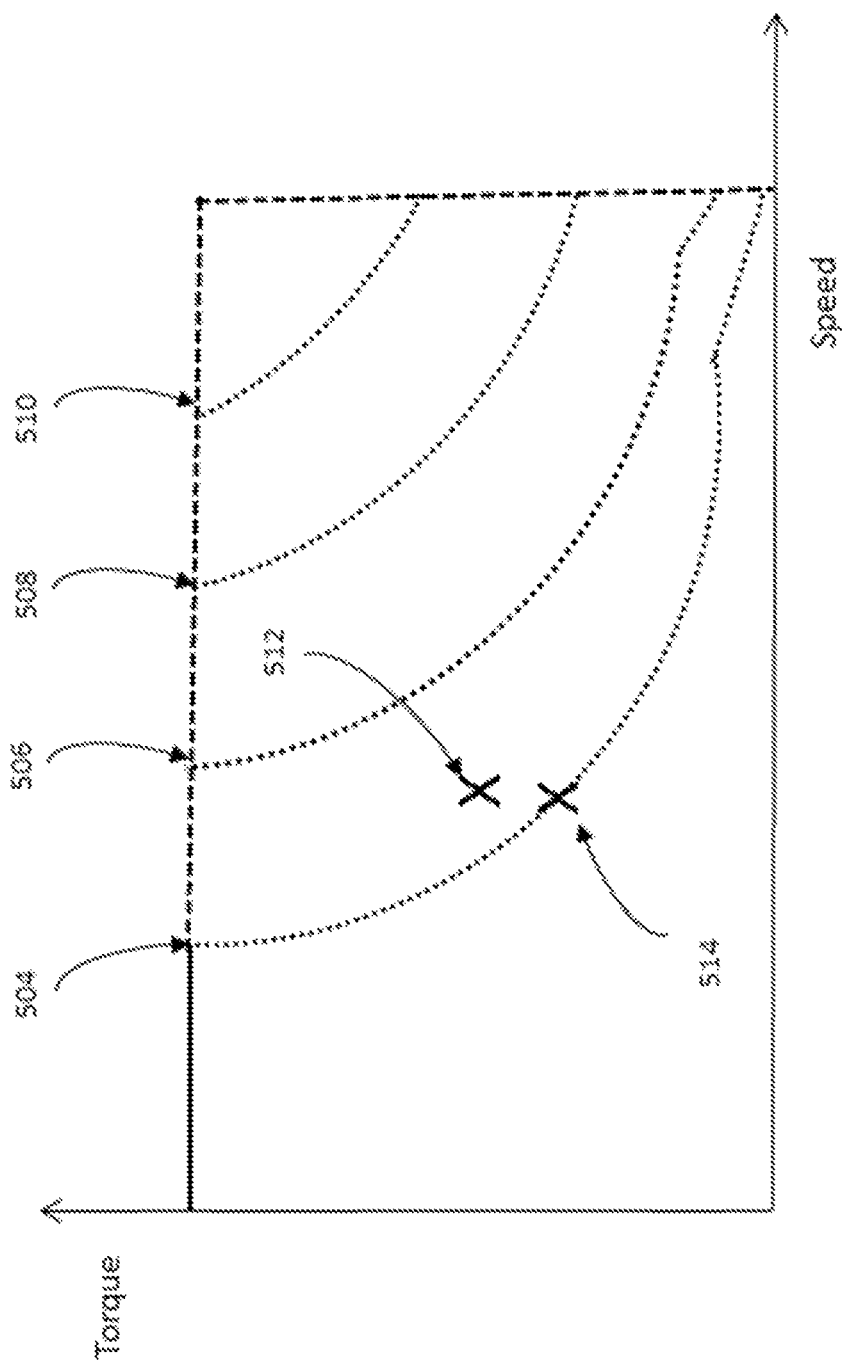
FIG. 5 is a graphical representation of using a multi-dimensional look-up table.

FIG. 5 illustrates a graphical representation of using a multi-dimensional look-up table based on a variety of voltage levels and rotor speeds. For example, line 504 represents the calibrated maximum torque capability at a particular bus voltage. Lines 506, 508, and 510 represent the calibrated maximum torque capability at progressively higher bus voltages. The look-up tables may be used when determining a maximum torque capability threshold based on the bus voltage $V_{dc}$ and rotor speed $\omega_R$. If the bus voltage value is between two calibrated bus voltage levels, the controller may look-up the maximum torque capability threshold based on the lower bus voltage level. For example, if the bus voltage falls between the level associated with line 504 and the level associated with line 506, the maximum torque capability threshold would be as shown at point 514. If the requested torque 512 is higher than the maximum torque capability threshold, the torque request is clipped to the maximum torque capability threshold. Clipping the requested torque to the level associated with a lower bus voltage level may cause underutilization of the electric machine's capability.

An alternative to using a multi-dimensional look-up table for maximum torque capability threshold is to use the single independent variable $\omega_{Norm}$ as calculated at 402 in FIG. 4. Table 2 illustrates a table of maximum torque capability vs. normalized speed. Using a table with a single independent variable reduces the approximation error and the calibration effort. The single independent variable look-up table may be used to improve PMSM performance while reducing the controller memory used.

TABLE 2

| Normalized Speed | Torque |
|---|---|
| $\omega_{Norm1}$ | $T_1$ |
| $\omega_{Norm2}$ | $T_2$ |
| $\omega_{Norm3}$ | $T_3$ |

TABLE 2-continued

| Normalized Speed | Torque |
|---|---|
| $\omega_{Norm4}$ | $T_4$ |
| $\omega_{Norm5}$ | $T_5$ |
| $\omega_{Norm6}$ | $T_6$ |
| $\omega_{Norm7}$ | $T_7$ |
| $\omega_n$ | $T_n$ |

Figure 6:
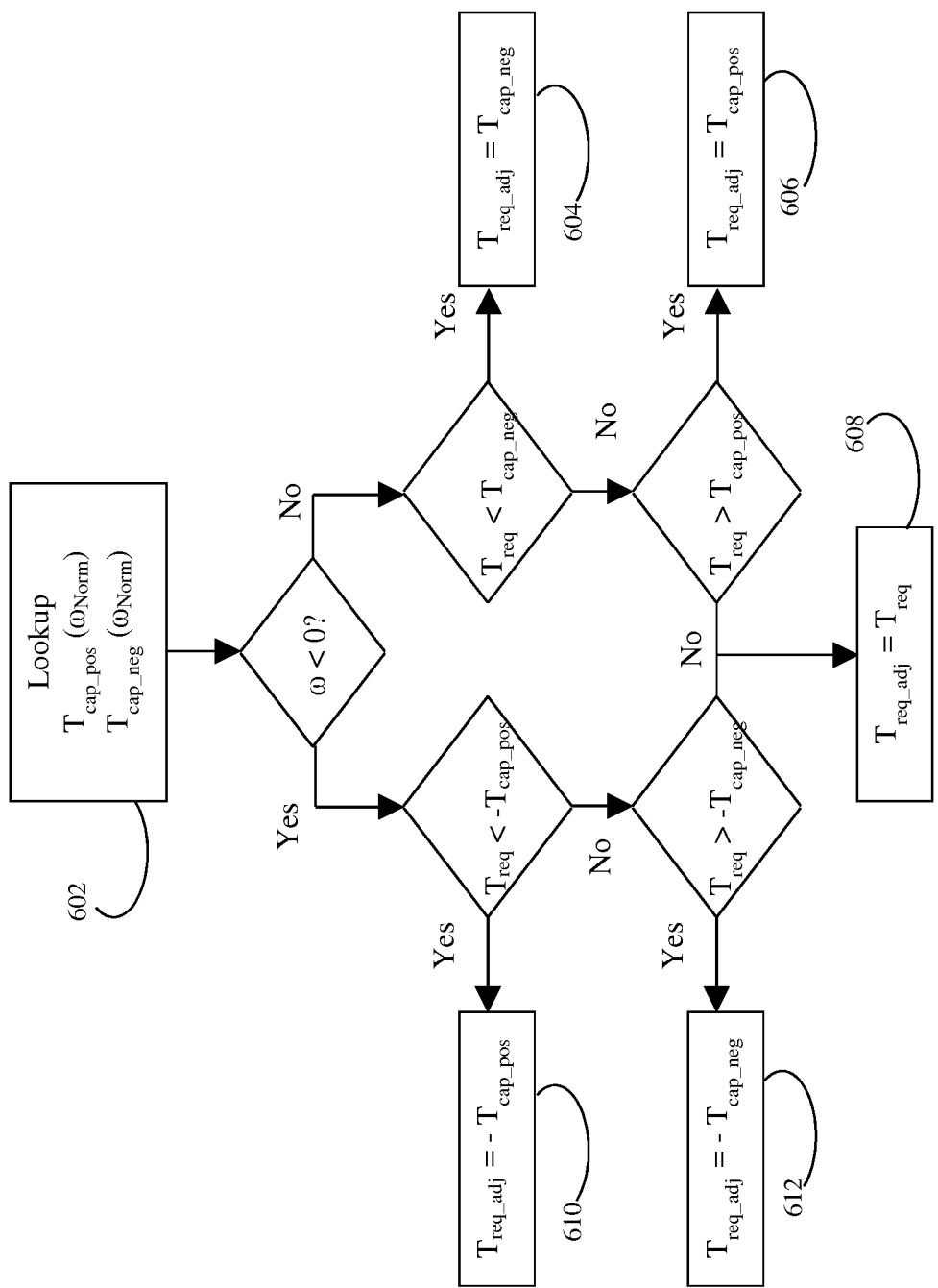
FIG. 6 is a flow chart for the method of adjusting the torque request.

FIG. 6 illustrates a method of adjusting the torque request at 404 in FIG. 4. Lookup tables store the maximum and minimum torque capability, $T_{cap\_pos}$ and $T_{cap\_neg}$ respectively, as a function of normalized speed, $\omega_{Norm}$. These tables are populated during calibration based on testing to characterize the motor. The testing during calibration may occur at bus voltages that differ from the current bus voltage. The controller looks up the values at the current normalized speed at 602. Due to the symmetry of the motor characteristics, the table is only populated for positive speeds. When motor speed is positive, the torque request is clipped at 604 if it is less than the minimum capability and clipped at 606 if it exceeds the maximum capability threshold. Otherwise, the torque request is unchanged at 608. When motor speed is negative, the roles of $T_{cap\_pos}$ and $T_{cap\_neg}$ are reversed, and out of range requests are clipped at 610 and 612. The output of this method is the adjusted torque request, $T_{req\_adj}$.

Figure 7:
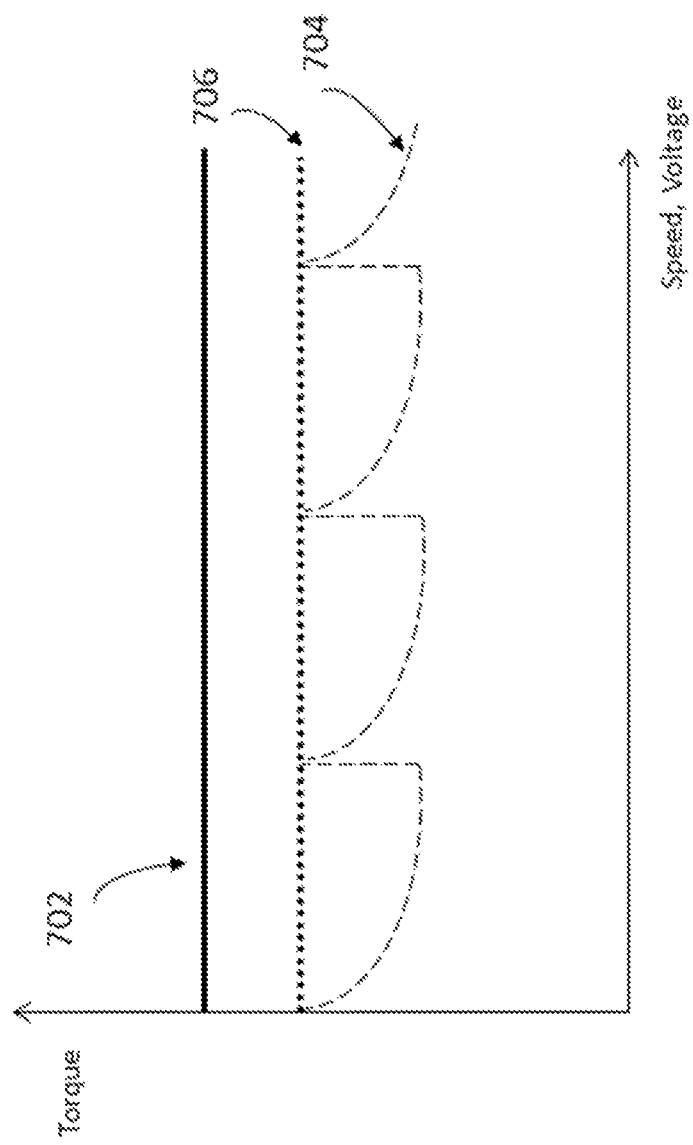
FIG. 7 is a graphical representation illustrating the difference between a multi-dimensional look-up table vs. a table with a single independent variable.

FIG. 7 illustrates a difference between using a table with a single independent variable and using a table with two independent variables. In this example, rotor speed $\omega$ and the bus voltage $V_{dc}$ both increase gradually and proportionately such that the ratio remains constant. The torque request 702 is higher than the motor capability, so clipping may be required. Line 704 illustrates the maximum torque capability threshold as computed with a multi-dimensional table. When the voltage is between two of the tabulated levels as mentioned in FIG. 5, the maximum torque capability threshold follows the curve associated with the lower of the two voltages. When the voltage increases above a tabulated value, the maximum torque capability jumps to the next curve. Even if interpolation is used, instead of selecting the lower voltage, the maximum torque capability threshold will fluctuate because the tabulated function is non-linear. Line 706 illustrates the maximum torque capability threshold as computed based on normalized speed. Since the speed and the voltage increase in proportion, the normalized speed does not change. Therefore, the maximum torque capability threshold 706 does not change and may remain constant for a period of time.

Utilization of the PMSM torque capability is improved by the use of the disclosed methods and systems. By improving the PMSM torque capability determination, a PMSM system may deliver torque closer to the requested torque. Instead of clipping a torque request to a voltage value within the look-up table, the controller may now deliver a constant torque value based on a ratio of speed to bus voltage. The constant torque value is calculated to achieve maximum torque capability of the PMSM ensuring a response expected by the requester.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine;
   a bus; and
   at least one controller configured to,
      in response to torque requests that exceed a torque capability threshold value of the electric machine retrieved from a single independent variable look-up table as a function of a normalized speed, issue torque commands based on the normalized speed of the electric machine by dividing a rotor speed by a voltage on the bus.

2. The vehicle of claim 1 wherein the controller comprises a variable voltage controller programmed to adjust the voltage on the bus.

3. The vehicle of claim 1 wherein the electric machine is a synchronous motor.

4. The vehicle of claim 1 wherein the controller comprises a vehicle system controller, an engine controller, a variable voltage controller and a motor controller.

5. The vehicle of claim 1 wherein a torque of the electric machine is equal to the torque capability threshold value as the rotor speed and voltage vary with a constant ratio of the rotor speed to the voltage.

6. The vehicle of claim 1 wherein a magnitude and phase of a current through windings of the electric machine is constant as the rotor speed and voltage vary with a constant ratio of the rotor speed to the voltage.

7. A vehicle comprising:
   an electric machine having windings;
   a bus; and
   a controller configured to, in response to torque requests that exceed a torque capability threshold value of the electric machine retrieved from a single independent variable look-up table as a function of a rotor speed divided by a voltage on the bus, issue torque commands for the electric machine such that a magnitude and phase of current through the windings remains unaltered as the speed and voltage vary with a constant ratio of the speed to the voltage.

8. The vehicle of claim 7 wherein the controller includes a variable voltage controller.

9. The vehicle of claim 7 wherein the electric machine is a permanent magnet synchronous motor.

10. The vehicle of claim 7 wherein the controller comprises a vehicle system controller, an engine controller, a variable voltage controller and a motor controller.

11. A method comprising:
    retrieving from a single independent variable look-up table a maximum torque capability based on a rotor speed divided by a voltage on a bus;
    in response to torque requests that exceed the maximum torque capability, issuing torque commands for an electric machine such that an electric machine torque is equal to the maximum torque capability as the speed and voltage vary with a constant ratio of the speed to the voltage.

12. The method of claim 11 wherein a magnitude and phase of current through the windings of the electric machine is constant as the speed and voltage vary with the constant ratio of the speed to the voltage.

* * * * *